(No Model.)
C. E. F. AHLM.
ELECTRIC GENERATOR OR MOTOR.
No. 566,120. Patented Aug. 18, 1896.
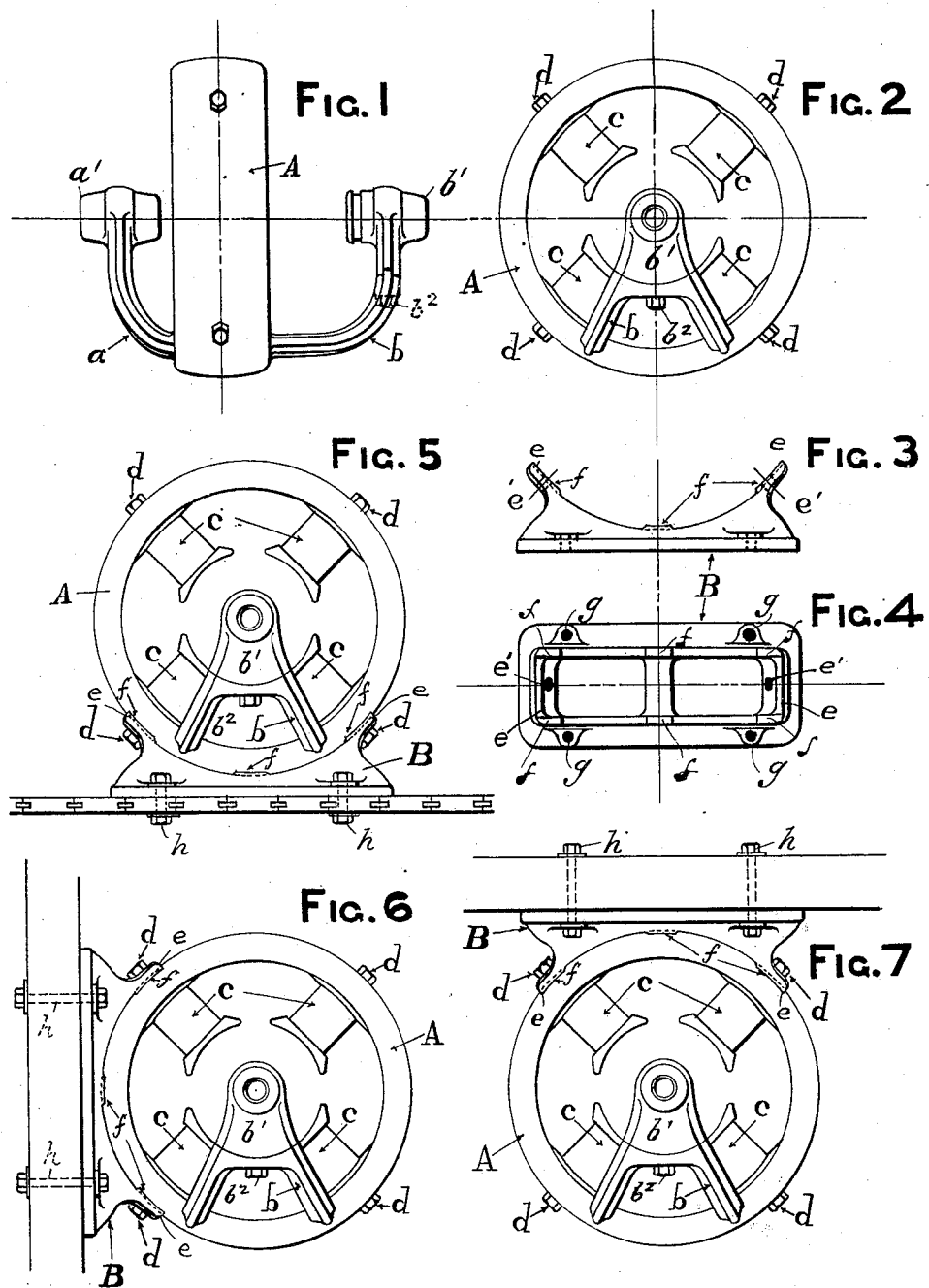
WITNESSES:
Wm V. Groff
J. E. Crawford
INVENTOR,
C. Edward F. Ahlm
BY
Wm A. Skinkle
ATTORNEY.

UNITED STATES PATENT OFFICE.

CHARLES EDWARD F. AHLM, OF CLEVELAND, OHIO, ASSIGNOR TO THE E. & C. ELECTRIC COMPANY, OF SAME PLACE.

ELECTRIC GENERATOR OR MOTOR.

SPECIFICATION forming part of Letters Patent No. 566,120, dated August 18, 1896.

Application filed May 16, 1896. Serial No. 591,831. (No model.)

*To all whom it may concern:*

Be it known that I, CHARLES EDWARD FRANS AHLM, a subject of the King of Sweden and Norway, but having declared my intention of becoming a citizen of the United States, residing at Cleveland, in the county of Cuyahoga and State of Ohio, have invented certain Improvements in Electric Generators or Motors, of which the following is a specification that will enable those skilled in the art to which my invention pertains to make and use the same.

The objects of my invention are to make an electric generator or motor which shall, with all its working parts, be entirely self-contained, and to provide such machine with a base-plate or saddle which will fit upon and may be attached to any of its sides, so that the generator or motor may be attached to the floor or side walls of a building or be suspended from a ceiling without inverting or otherwise changing the position of the motor and its working parts.

Otherwise expressed the generator or motor with all its working parts is placed in the same upright position whether fastened to the floor, walls, or ceiling of a building, the base or saddle which supports it being adapted to fit upon any of its sides which may be adjacent to the surface against which the generator or motor is to be secured. The advantage of this device is that the generator or motor may be built complete in the shop and equipped with appliances for lubricating, &c., without regard in any case to the future position of the generator or motor, which with its shifting base or saddle is adapted to be attached to any ordinary surface without special previous preparation therefor.

The accompanying drawings show my invention in the best form now known to me, but some changes in the peculiar shapes or numbers of the parts obvious to a skilful mechanic and not requiring the exercise of invention might be made therein without departing from the spirit of my invention as set forth in the claims at the end of this specification.

Figure 1 is a view in elevation of the ring or main frame of my improved generator or motor with the arms or brackets which carry the bearings of the armature-shaft made integral therewith. Fig. 2 is a side elevation of the same, showing also the four cores of the field-magnets secured against the inner face of the ring. Fig. 3 is a detached view of the base-plate or saddle which carries the generator or motor and which in turn is adapted to be secured to a floor, wall, or ceiling, which supports the generator or motor. Fig. 4 is a plan view of the same. Figs. 5, 6, and 7 are views in elevation of the generator or motor and its base or saddle attached to floor, wall, and ceiling, respectively, the generator or motor in each case retaining its upright position while the location of the base or saddle thereon is changed to adapt it to the plane of the surface against which the generator or motor is secured.

The main frame of the generator or motor consists, preferably, of a solid ring A, from each side of which extend brackets $a$ and $b$, which support the bearings $a'$ and $b'$ of the armature-shaft. The bearing $b'$ is preferably separable from the bracket $b$ and is held in place thereon by a bolt $b^2$. The metallic cores $c$ of the field-magnets rest against the interior face of the ring and are held in place by bolts $d$, which pass through the ring and screw into the cores. These cores are preferably four in number and are located at the four diagonal quarters of the plane of the ring, so that their axes stand at angles of forty-five degrees to the horizontal and vertical lines drawn across this plane. The base or saddle B is curved on its upper face to fit against the exterior of the ring and is provided at each end with projecting flanges $e$, through which are bolt-holes $e'$, so spaced that they will register with any two of the holes in the ring A through which the core-bolts $d$ pass. By this means I am enabled to use any two of the core-bolts $d$ to secure the base B to the ring A, and without other material change this base may be applied to either the top, bottom, or either side of the ring. To further hold the ring in proper place on the base, I provide on the base three pairs of lugs or short flanges $f$, which embrace the edges of the ring at both sides, as will be clearly understood. The bottom flange of the base or saddle is provided with four holes $g$, through which pass the anchor or holding bolts $h$, by means of which the saddle is fastened to its foundation or support.

All the moving or working parts of the generator or motor are carried and supported by the ring A and the arms $a$ and $b$, extending therefrom, so that the machine is complete within itself and no changes in the position of the base or saddle affect in any way the relations of the working parts of the generator or motor.

I find in the practical manufacture of such devices that it is a great advantage in the factory to be able to make them all alike and not have to consider in connection with each one the adjustment of parts, location of lubricating-holes, &c., with special regard to the future position it may be intended to occupy. This not only saves a great deal of care in the management of a factory turning out a large number of machines, but it adds largely to the value of those machines if they can without special expense or material changes be adapted at any time to suit other conditions or locations than those for which they were originally purchased.

Having thus described my invention, what I claim as new and useful, and desire to secure by Letters Patent, is—

1. The combination in an electric generator or motor of a surrounding frame adapted to carry and support all the working parts of said machine, with a base or saddle adapted to fit upon and be secured to any side of said frame and to the surface upon or against which the motor is to be supported substantially as and for the purpose hereinbefore set forth.

2. In an electric generator or motor the combination of the surrounding frame A, the field-magnet cores $c$, held in place by the bolts $d$, which pass through the frame, with the separate base or saddle B, adapted to fit against the outer sides of the frame A, and having bolt-holes which register with the bolt-holes $d$, in said frame as and for the purpose specified.

3. In an electric generator or motor, the combination of the surrounding frame A, the field-magnet cores $c$, located within the frame and held by bolts $d$, which pass through the frame, with a base or saddle B, adapted to fit against the outer surface of the frame and having bolt-holes which register with the bolt-holes $g$, in the frame and lugs $f$, which embrace the sides of the frame substantially as and for the purpose hereinbefore set forth.

In testimony whereof I affix my signature, in the presence of two witnesses, at Cleveland, Ohio, April 16, 1896.

C. EDWARD F. AHLM.

Witnesses:
 E. W. DISSETTE,
 WM. A. SKINKLE.